United States Patent [19]
Yoshikawa

[11] Patent Number: 5,244,287
[45] Date of Patent: Sep. 14, 1993

[54] BEARING MALFUNCTION DETECTING DEVICE

[75] Inventor: Kazuhiro Yoshikawa, Kanagawa, Japan

[73] Assignee: Atsugi Unisia Corporation, Japan

[21] Appl. No.: 972,916

[22] Filed: Nov. 6, 1992

[30] Foreign Application Priority Data

Nov. 14, 1991 [JP] Japan .............. 3-093464[U]

[51] Int. Cl.$^5$ ............................................. F16C 41/00
[52] U.S. Cl. ............................................. 384/448
[58] Field of Search ....................... 384/448, 62 Y

[56] References Cited

U.S. PATENT DOCUMENTS

| | | | |
|---|---|---|---|
| 3,373,300 | 3/1968 | Sullivan | 384/448 X |
| 4,063,786 | 12/1977 | Rall | 384/448 |
| 4,629,261 | 12/1986 | Eiermann et al. | 384/448 X |
| 4,664,539 | 5/1987 | Li | 384/448 X |

FOREIGN PATENT DOCUMENTS 52-35379 8/1977 Japan .

Primary Examiner—Thomas R. Hannon
Attorney, Agent, or Firm—Ronald P. Kananen

[57] ABSTRACT

A bearing malfunction detecting device can detect abnormal abrasion of a bearing by which a shaft is rotatably held. The detecting device comprises an annular plate coaxially and securely disposed about the shaft to rotate therewith. A wire carrier is connected to a fixed support member at a position near the annular plate. The wire carrier has a recessed head portion which spacedly receives therein an peripheral portion of the annular plate. A detecting device is used for detecting breakage of the recessed head portion.

10 Claims, 3 Drawing Sheets

BEARING MALFUNCTION DETECTING DEVICE

BACKGROUND OF THE INVENTION

1. Field of the Invention

The present invention relates to detecting devices for detecting malfunctions or marked abrasion of a bearing for a shaft.

2. Description of the Prior Art

One of the above-mentioned detecting devices is shown in Japanese Utility Model Second Provisional Publication 52-35379. In the device of the publication, a so-called "shaft vibration detecting piece" is radially movably arranged near a shaft which is rotatably held by a bearing. When, due to marked abrasion of the bearing, the shaft is subjected to abnormal vibration in radial direction, the shaft vibration detecting piece is shifted outward by the shaft to a position to actuate a limit switch. Thus, the marked abrasion of the bearing, which causes the abnormal rotation of the shaft, can be detected by the operation of the limit switch.

However, due to its inherent construction, the above-mentioned conventional detecting device has the following drawback.

That is, the conventional device can not detect an abnormal abrasion of the bearing which causes axial vibration of the shaft. In fact, even when the axial vibration of the shaft occurs due to peeling of parts of the bearing or the like, the shaft vibration detecting piece is not moved by the shaft. In this case, there is a possibility that the severely worn bearing is used until the same is completely broken. Of course, this is a serious matter because pieces in the broken bearing tend to induce trouble of a system in which the bearing is employed.

SUMMARY OF THE INVENTION

It is therefore an object of the present invention to provide a device for detecting malfunctions of a bearing for a shaft, which is free of the above-mentioned drawback.

According to a first aspect of the present invention, there is provided a bearing malfunction detecting device for use in an arrangement which includes a fixed support member, a bearing held by the support member and a shaft rotatably held by the bearing. The bearing malfunction detecting device comprises a first member connected to the shaft to rotate therewith; a second member connected to the fixed support member at a position near the first member, the second member having a recessed head portion which spacedly receives therein a peripheral portion of the first member; and detecting means for detecting a breakage of the recessed head portion.

According to a second aspect of the present invention, there is provided a bearing malfunction detecting device for use in a water pump which is associated with an internal combustion engine and comprises a pump body secured to a cylinder block of the engine, a bearing installed in the pump body, a shaft rotatably held by the bearing and driven by the engine and a pump impeller coaxially connected to the shaft. The bearing malfunction detecting device comprises an annular plate coaxially and securely disposed about the shaft to rotate therewith; a wire carrier connected to the pump body at a position near the annular plate, the wire carrier having a recessed head portion which spacedly receives therein an peripheral portion of the annular plate; and detecting means for detecting a breakage of the recessed head portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
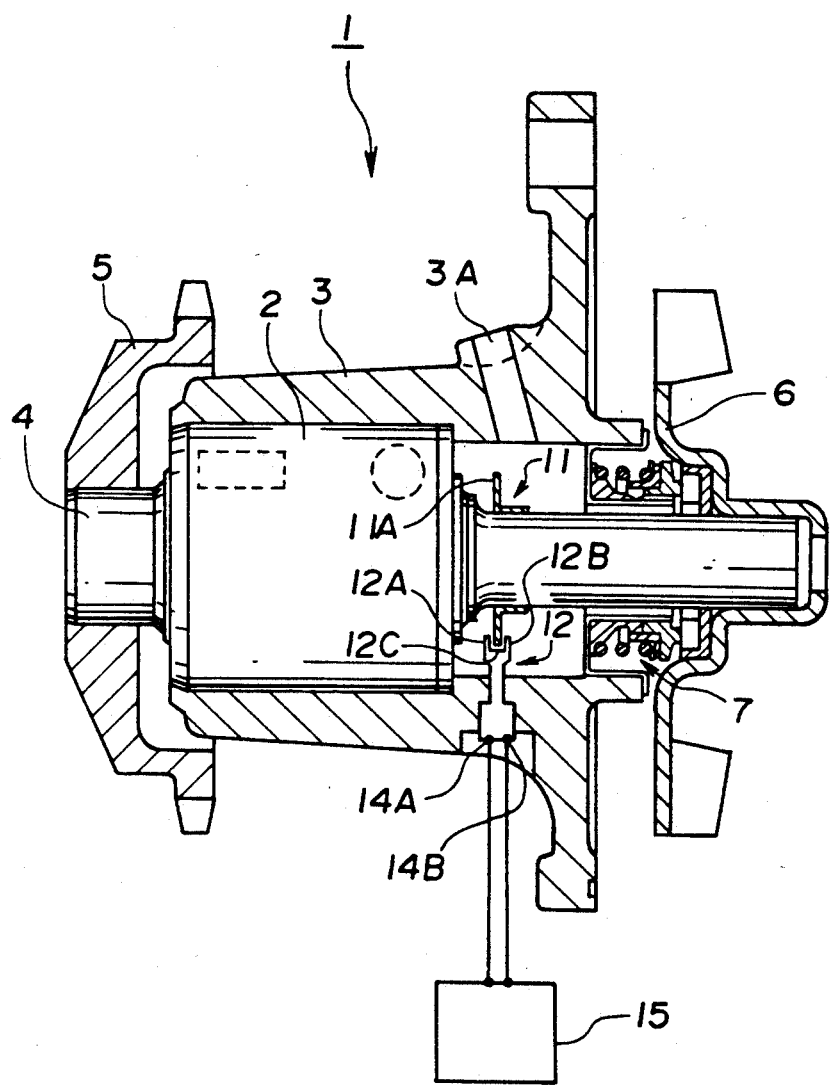
FIG. 1 is a sectional view of a water pump to which a bearing malfunction detecting device of the present invention is practically applied.

Referring to the drawings, particularly, FIG. 1, there is shown a water pump 1 to which a bearing malfunction detecting device according to the present invention is practically applied.

Prior to making a detailed description of the bearing malfunction detecting device of the invention, the water pump 1 will be outlined.

The water pump 1 is associated with an automotive internal combustion engine to pump up cooling water for the engine.

In FIG. 1, denoted by numeral 3 is a pump body. The pump body 3 has at its right portion a flange (no numeral) secured to a cylinder block (not shown) of the engine through bolts (not shown). The cylinder block has therein a pump chamber in which an after-mentioned pump impeller 6 is installed. A shaft 4 is rotatably received in the pump body 3 through a bearing 2. The shaft 4 has at its left end a sprocket wheel 5 secured thereto. The sprocket wheel 5 is meshed with a chain (not shown) which is put around a crankshaft of the engine and a cam shaft of the same. Thus, when the engine operates, the shaft 4 is driven or rotated by the chain. The shaft 4 has at its right portion the pump impeller 6 secured thereto. A known mechanical seal 7 is arranged at a left side of the pump impeller 6 keeping a certain annular space between the seal 7 and the bearing 2. The pump body 3 is formed with a steam passage 3A through which steam in the space is discharged. In fact, under operation of the engine, part of steam in the pump chamber is forced to penetrate into the space through the mechanical seal 7. Although not shown in the drawings, the pump body 3 has further a water drain passage from which water in the space is drained.

Under operation of the engine, the shaft 4 is rotated and thus the pump impeller 6 is rotated in a given direction. Due to rotation of the pump impeller 6, cooling water is forced to flow from an inlet port (not shown) of the pump chamber toward an outlet port (not shown) of the same.

In the following, the bearing malfunction detecting device of the present invention will be described in detail.

As is seen from FIG. 1, the detecting device comprises an annular plate 11 which is coaxially and securely disposed through its flange portion on the shaft 4 in the annular space. Thus, the annular plate 11 rotates together with the shaft 4, and thus the annular plate 11 can serve as a slinger ring by which water in the annular space is slung radially outward.

Near a peripheral portion 11A of the annular plate 11, there is located a wire carrier 12 which is secured to the pump body 3. The wire carrier 12 has a generally U-shaped head portion which comprises spaced side walls 12A and 12B and a bottom wall 12C. The side walls 12A and 12B are spaced from each other in the direction parallel with the axis of the shaft 4. The peripheral portion 11A of the annular plate 11 is spacedly received in the U-shaped head portion of the wire carrier 12. That is, each of the three walls 12A, 12B and 12C is spaced from the peripheral portion 11A of the annular plate 11 by a given distance.

Figure 2:
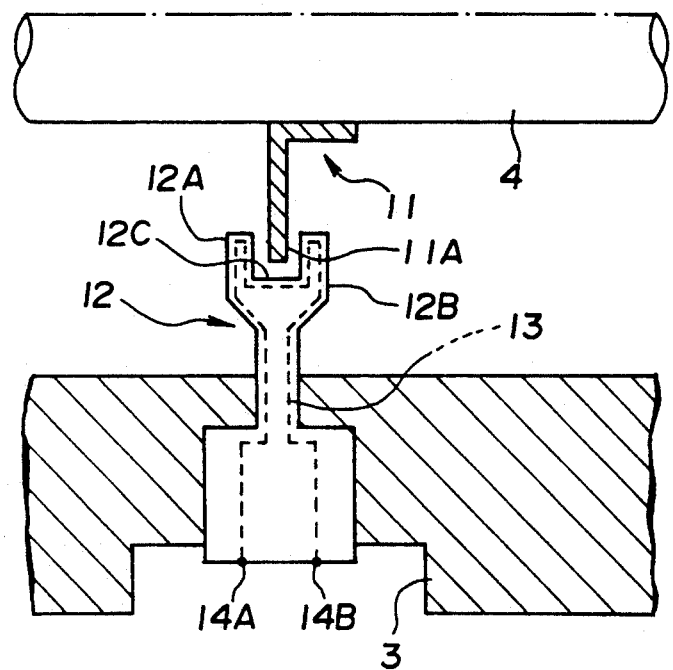
FIG. 2 is an enlarged sectional view of an essential portion of the bearing malfunction detecting device of the invention.

As is seen in FIG. 2, the U-shaped head portion of the wire carrier 12 has thereon a wire 13 which extends in series along the side wall 12A, the bottom wall 12C and the other side wall 12B. That is, the wire 13 has at least three portions which extend sufficiently in the areas of the three walls 12A, 12B and 12C respectively. The wire 13 has opposed ends to which respective terminals 14A and 14B are connected. Thus, the wire 13 constitutes a series circuit between the two terminals 14A and 14B.

Each wall 12A, 12B or 12C of the U-shaped head portion of the wire carrier 12 is so constructed as to be broken when the peripheral portion 11A of the annular plate 11 abuts the wall 12A, 12B or 12C during rotation of the annular plate 11. Of course, when the wall 12A, 12B or 12C is broken, the corresponding portion of the wire 13 is broken. The wire carrier 12 is entirely or partially constructed of a somewhat breakable material, such as a semi-rigid sintered material or the like. Of course, by reducing the thickness of the wire carrier 12, the rigidity of the same can be reduced.

Referring back to FIG. 1, to the terminals 14A and 14B of the wire 13, there is connected, through wires (no numerals), a warning circuit 15 by which the breakage of the wire 13 at the U-shaped head portion of the wire carrier 12 is visually or acoustically indicated. The warning circuit 15 is equipped with a relay or the like which is actuated when the series circuit of the wire 13 between the terminals 14A and 14B is broken.

In the following, operation of the bearing malfunction detecting device of the invention will be described with reference to the drawings.

For ease of understanding, the description will be commenced with respect to a normal condition of the bearing 2 of the water pump 1, which is shown in FIGS. 1 and 2. Under this condition, there is no vibration of the shaft 4. Thus, the annular plate 11 secured to the shaft 4 rotates freely without contacting the U-shaped head portion of the wire carrier 12. Of course, under this condition, the warning circuit 15 does not issue any warning.

Figure 3:
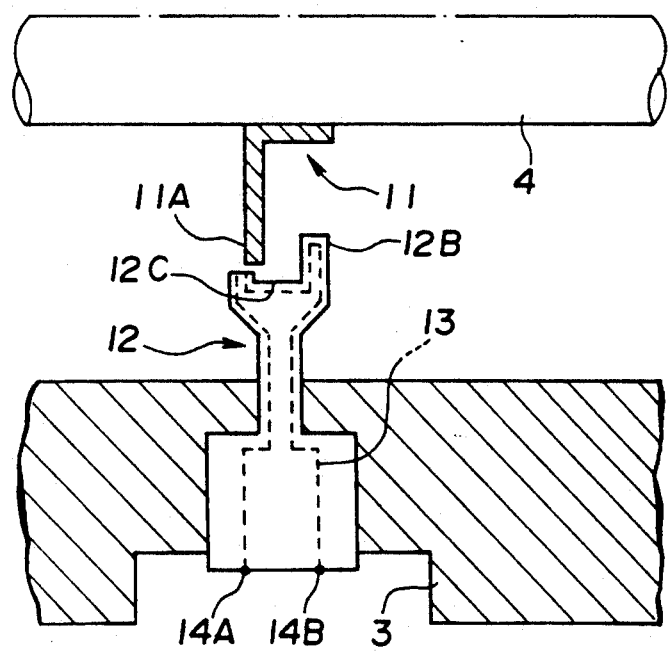
FIG. 3 is a view similar to FIG. 2, but showing a condition wherein a part of a detector unit is broken.

When, due to marked abrasion of the bearing 2 or the like, the shaft 4 is subjected to axial vibration, the peripheral portion 11A of the annular plate 11 abuts against at least one of the side walls 12A and 12B of the wire carrier 12 and breaks the same, as is seen from FIG. 3. With this, the series circuit of the wire 13 is broken, and thus the warning circuit 15 issues a visual or acoustic alarm letting the operator realize marked abrasion of the bearing 2.

Figure 4:
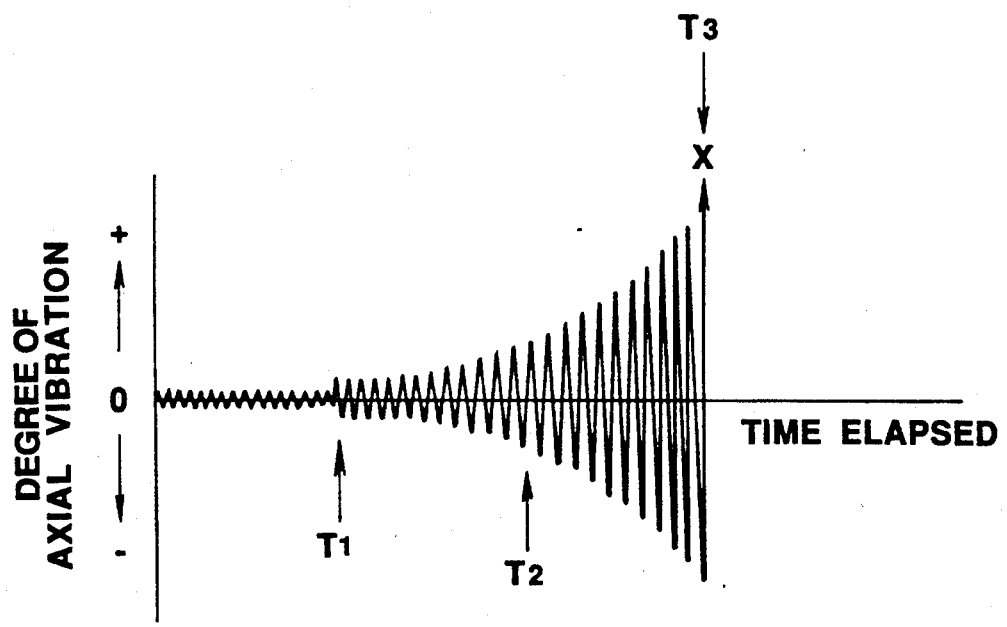
FIG. 4 is a graph showing the degree of axial vibration of a shaft with respect to the time elapsed.

FIG. 4 is a graph which shows the degree of the axial vibration of the shaft 4 with respect to the time elapsed. As is seen from this graph, due to advancing abrasion of the bearing 2, the degree of the axial vibration increases with increase of the time. In the graph, denoted by reference "$T_1$" is the time when the bearing 2 exhibits an initial severe abrasion and denoted by reference "$T_3$" is the time when the bearing 2 is completely broken. Denoted by reference "$T_2$" is the time when one of the side walls 12A and 12B of the U-shaped head portion of the wire carrier 12 should be broken due to the marked abrasion of the bearing 2.

When, due to marked abrasion of the bearing 2 or the like, the shaft 4 is subjected to radial vibration, the peripheral portion 11A of the annular plate 11 abuts against the bottom wall 12C of the wire carrier 12 and breaks the same. With this, the warning circuit 15 issues a visual or acoustic alarm, like in the case of the above-mentioned axial vibration of the shaft 4.

As is seen from the above, in accordance with the present invention, the marked abrasion of the bearing 2 (viz., abnormally worn condition of the bearing 2) can be detected by not only the radial vibration of the shaft 4 but also the axial vibration of the shaft 4. Thus, the bearing malfunction detecting device of the invention has a higher detectability as compared with the above-mentioned conventional device.

The following modification is available in the present invention.

That is, when a system including the wire 13 and the warning circuit 15 is connected to each of the three walls 12A, 12B and 12C of the wire carrier 12, the characteristic of the shaft vibration is known and thus the abrasion of the bearing 2 can be much more highly analyzed.

What is claimed is:

1. In an arrangement including a fixed support member, a bearing held by said support member and a shaft rotatably held by said bearing,
   a bearing malfunction detecting device comprising:
   a first member connected to said shaft to rotate therewith;
   a second member connected to said fixed support member at a position near said first member, said second member having a recessed head portion which spacedly receives therein a peripheral portion of said first member; and
   detecting means for detecting a breakage of said recessed head portion.

2. A bearing malfunction detecting device as claimed in claim 1, in which said recessed head portion comprises:
   two side walls which are spaced from each other in a direction parallel with the axis of said shaft, said two side walls putting therebetween said peripheral portion of said first member keeping a given space between each of said side walls and said peripheral portion; and
   a bottom wall located at a radially outer side of said peripheral portion of said first member.

3. A bearing malfunction detecting device as claimed in claim 2, in which at least said recessed head portion of said second member is so constructed as to be broken when said peripheral portion of said first member abuts the same.

4. A bearing malfunction detecting device as claimed in claim 3, in which said first member is an annular plate which is coaxially and securely disposed on said shaft.

5. A bearing malfunction detecting device as claimed in claim 4, in which said second member is constructed of a semi-regid sintered material.

6. A bearing malfunction detecting device as claimed in claim 2, in which said detecting means comprises:
- a wire extending along said two side walls and said bottom wall; and
- a warning circuit electrically connected to said wire, said warning circuit issuing an alarm when said wire is broken.

7. In a water pump associated with an internal combustion engine and comprising a pump body secured to a cylinder block of the engine, a bearing installed in said pump body, a shaft rotatably held by said bearing and driven by said engine and a pump impeller coaxially connected to said shaft,
- a bearing malfunction detecting device comprising:
  - an annular plate coaxially and securely disposed about said shaft to rotate therewith;
  - a wire carrier connected to said pump body at a position near said annular plate, said wire carrier having a recessed head portion which spacedly receives therein a peripheral portion of said annular plate; and
  - detecting means for detecting a breakage of said recessed head portion.

8. A bearing malfunction detecting device as claimed in claim 7, in which said recessed head portion comprises:
- two side walls which are spaced from each other in a direction parallel with the axis of said shaft, said two side walls putting therebetween said peripheral portion of said annular plate keeping a given space between each of said side walls and said peripheral portion; and
- a bottom wall located at a radially outer side of said peripheral portion of said annular plate.

9. A bearing malfunction detecting device as claimed in claim 8, in which said detecting means comprises:
- a wire extending along said two side walls and said bottom wall; and
- a warning circuit electrically connected to said wire, said warning circuit issuing an alarm when said wire is broken.

10. A bearing malfunction detecting device as claimed in claim 7, in which said annular plate is a slinger ring.

* * * * *